United States Patent
Kaimai et al.

(10) Patent No.: US 6,548,457 B1
(45) Date of Patent: Apr. 15, 2003

(54) LUBRICANT FOR REFRIGERATING MACHINE EMPLOYING AMMONIA REFRIGERANT

(75) Inventors: Takashi Kaimai, Toda (JP); Hitoshi Takahashi, Toda (JP)

(73) Assignee: Japan Energy Corporation, Tokyo (JP)

( * ) Notice: Subject to any disclaimer, the term of this patent is extended or adjusted under 35 U.S.C. 154(b) by 0 days.

(21) Appl. No.: 09/701,116

(22) PCT Filed: Mar. 17, 2000

(86) PCT No.: PCT/JP00/01674
§ 371 (c)(1),
(2), (4) Date: Jan. 17, 2001

(87) PCT Pub. No.: WO00/63326
PCT Pub. Date: Oct. 26, 2000

(30) Foreign Application Priority Data

Apr. 15, 1999 (JP) ............................................. 11-107831

(51) Int. Cl.⁷ .................. C10M 145/24; C10M 169/04; C09K 5/04
(52) U.S. Cl. ........................ 508/280; 508/251; 508/485; 508/556; 508/579; 508/583; 252/67; 252/68; 62/502
(58) Field of Search .................. 508/280, 579; 252/68; 62/502

(56) References Cited

U.S. PATENT DOCUMENTS

| | | | | |
|---|---|---|---|---|
| 5,366,646 A | | 11/1994 | Sato et al. .................. 508/262 |
| 5,413,728 A | * | 5/1995 | Mall et al. ..................... 252/68 |
| 5,560,854 A | | 10/1996 | Kaimai et al. ................ 252/68 |
| 5,595,678 A | * | 1/1997 | Short et al. .................... 252/68 |
| 5,651,257 A | * | 7/1997 | Kasahara et al. .............. 62/84 |
| 5,688,433 A | * | 11/1997 | Kasahara et al. ............. 252/68 |
| 6,239,086 B1 | * | 5/2001 | Hirano et al. ............... 508/579 |
| 6,335,311 B1 | * | 1/2002 | Namiki et al. .............. 508/579 |

FOREIGN PATENT DOCUMENTS

| | | |
|---|---|---|
| EP | 0 699 737 A2 | 3/1996 |
| JP | 6-158079 | 6/1994 |
| JP | 10-36865 | 2/1998 |
| WO | WO 94/12594 | 6/1994 |

* cited by examiner

*Primary Examiner*—Ellen M. McAvoy
(74) *Attorney, Agent, or Firm*—Hollander Law Firm, P.L.C.

(57) ABSTRACT

The present invention provides a lubricant for a compression type refrigeration system using ammonia as a refrigerant, which comprises polyether compounds and aromatic amine compounds or phenothiazine compounds, and preferably further comprises alcohol compounds such as polyhydric alcohol partial ether and/or benzotriazole compounds. Further, the present invention provides a working fluid composition comprising the lubricant and an ammonia refrigerant, and a refrigeration system which is filled with the working fluid composition. The lubricant has not only good compatibility with ammonia, but excellent stability and lubricating property, and therefore can suitably used in a compression type refrigeration system using an ammonia refrigerant that does not have the possibility of ozone layer depletion and global warming phenomenon.

19 Claims, No Drawings

LUBRICANT FOR REFRIGERATING MACHINE EMPLOYING AMMONIA REFRIGERANT

BACKGROUND OF THE INVENTION

1. Field of the Invention

The present invention relates to a lubricant for a compression type refrigeration system using ammonia refrigerant that does not have the possibility of ozone layer depletion and global warming. Further, the present invention relates to a working fluid composition comprising the ammonia refrigerant and the lubricant, and a refrigeration system which is filled with the working fluid composition.

2. Description of the Related Art

A compression type refrigeration system is composed of a compressor, a condenser, an expansion mechanism (such as an expansion valve or a capillary tube), an evaporator and so forth, and conducts cooling by utilizing a property of a refrigerant with high volatility which takes latent heat from its surroundings during evaporation. The compression type refrigeration system is used in a refrigerator, a freezer, an air conditioner, a showcase, a vending machine of soft drinks or ice creams, and the like. In air conditioner, vending machine or the like, the system is also used as a heater to warm the air, or drinks and foods by utilizing heat generated by condensing.

As the refrigerant, (hydro) fluorocarbons containing chlorine (CFC or HCFC) have conventionally been used. Recently, CFC or HCFC is being replaced by hydrofluorocarbons (HFC) not containing chlorine. However, CFC and HCFC break an ozone layer, and HFC has a high global warming ability. In view of earth environment protection, refrigerants that do not adversely-affect environment are desired as alternates of those hydrofluorocarbons. As a result, refrigerants such as low molecular weight hydrocarbons or ammonia, which do not break an ozone layer and have much smaller global warming ability than the above hydrofluorocarbons, become reevaluated as environment-friendly refrigerants. In particular, ammonia has high coefficient of performance.

Mineral oils or alkylbenzenes have been used as a base oil for a lubricant for a refrigeration system using an ammonia refrigerant. Recently, polyether compounds having compatibility with ammonia are proposed (for example, European Patent No. 490810A, European Patent No. 585934A, German Patent No. 4404804A and International Patent WO 95/12594A). By using a polyether compound having a compatibility with ammonia, there is the advantage that it is not necessary to provide a lubricant circulation facilities that separate and recover a lubricant at a discharge side of a refrigerating compressor, and return the recovered lubricant to the compressor.

However, ammonia as a refrigerant is a compound having high activity, it reacts with a base oil or additives of a lubricant for a refrigeration system, or deteriorated materials thereof to form separation substances (reaction products). As a result, there is fear of plugging of an expansion valve or capillary, abrasion of a sliding member, and further promoting deterioration of the lubricant. Further, ammonia has high corrosion property to a metal, particularly under the presence of water, and by using it with a polyether compound having high hygroscopicity, corrosion and deterioration of a metal, such as rust, are promoted. Further, because ammonia refrigerant requires high pressure operation compared with flon type refrigerant, refrigerant and lubricant are exposed to severer conditions such as high temperature and high pressure, and sliding conditions also become hard. As a result, there are the possibilities of increase of formation of separation substances, promotion of deterioration of lubricant (base oil and additives), and increase of friction and abrasion. Lubricants that have high lubricating properties including stability even under the severe condition using ammonia refrigerant are desired.

Regarding polyether compounds, derivatives of polyether compounds in which its terminal hydroxyl group is substituted with alkyl group or acyl group to improve stability and hygroscopicity (hereinafter referred to "polyether compounds" including derivatives) are proposed. However, the step producing the derivatives is added, and it brings the disadvantage such that good compatibility with ammonia lowers. Thus, the degree of improvement in stability and hygroscopicity are not sufficiently satisfied, and there is a limit to resolve by a base oil only. Therefore, it is required to select and use an appropriate additive in the combination of ammonia and a base oil. However, in many cases, additives have higher activity than base oil, more easily react with ammonia, and may promote deterioration and formation of separation substance.

SUMMARY OF THE INVENTION

An object of the present invention is to provide a lubricant having excellent compatibility with ammonia and having excellent performances of good stability and lubricating properties for practical use, as a lubricant for a refrigeration system using ammonia refrigerant.

The present invention has solved the above-mentioned various problems and achieved the the expected results. That is, the present invention provides a lubricant for a compression type refrigeration system using ammonia as a refrigerant, and the lubricant comprises (A) at least one kind of polyether compounds, and (B) at least one kind of aromatic amine compounds or phenothiazine compounds, and the lubricant preferably further comprises (C) at least one kind of alcohol compounds selected from the group consisting of oleyl alcohol, polyhydricalcohol partial ester and polyhydricalcohol partial ether, and/or (D) at least one kind of benzotriazole compounds selected from benzotriazole and its derivatives.

The present invention further provides a working fluid composition for a compression type refrigeration system, comprising the lubricant and ammonia refrigerant.

The present invention further provides a refrigeration system which is filled with the working fluid composition.

BEST MODES FOR CARRY OUT THE INVENTION

The polyether compounds (A) used in the present invention are used as a base oil that is the main component of a lubricant. Though they include various compounds, the polyether compounds may be used by appropriately selecting according to the purpose of use or the like. The preferable compounds include polyether compounds represented by the following formula (1):

$$X[-O-(AO)_n-R]_m \qquad (1)$$

where X shows a hydrocarbon group in the form of excluding hydroxyl group from monool or polyol, A shows an alkylene group having 2–4 carbon atoms, R shows hydrogen or an alkyl group having 1–10 carbon atoms, m is a valence number of X, and n is a positive integer of 2 or more.

In the above formula (1), if X is a hydrocarbon group in the form of being derived from monool, X is preferably a straight-chain or branched-chain, saturated or unsaturated hydrocarbon group having 1–20 carbon atoms, and further preferably an alkyl group having 1–8 carbon atoms. Specific examples of the preferred monool include methanol, ethanol, propanol, butanol, pentanol, hexanol, heptanol and octanol. If X is in the form of being derived from polyol, X is preferably a hydrocarbon group in the form of removing all hydroxyl groups from divalent to hexavalent polyol having 2–15 carbon atoms. Specific examples of the polyol include ethylene glycol, propylene glycol, glycerol, trimethylol ethane, trimethylol propane, trimethylol butane, pentaerythritol, sorbitan, sorbitol, and the like. Condensation type polyols such as diglycerol or dipentaerythritol may be used.

If the valence number m of X becomes large, the molecular weight of the polyether compound increases and its viscosity is too high, so that there is the tendency that compatibility with ammonia lowers. Therefore, the valence number m of X is preferably 1, 2 or 3. Of those, the valence number m of 1, that is, a hydrocarbon group in the form of being derived from monool, is particularly preferable as X. Even in such a hydrocarbon group, if the number of carbon atoms increases, viscosity becomes too high, compatibility lowers. Therefore, the carbon number of X is preferably 1–8 as mentioned above, more preferably 1–4. The most preferable X is methyl group. As X is a hydrocarbon group in the form of removing hydroxyl group from monool or polyol, X may include alcohol (monool or polyol) derivatives such as sodium alcoholate or potassium alcoholate, or compounds derived from alkylene oxide. Further, R represents hydrogen or an alkyl group having 1–10 carbon atoms. In the case that m is 2 or more, a plurality of R, i.e., a plurality of hydrogen and alkyl groups, can be present in one molecule. In this case, R may be only hydrogen atoms, or only the same alkyl groups, and may be a combination of hydrogen (S) and alkyl group (S), different alkyl groups, or hydrogen (S) and a plurality of different alkyl groups.

In the case that R is hydrogen, the compound is a polyether compound having hydroxyl group at the terminal. In the case that R is alkyl group, the compound is a polyether compound in which the terminal thereof is blocked by alkyl group. The polyether compound having hydroxyl group at the terminal has excellent compatibility with ammonia, on the other hand, a compound having alkyl group at the terminal has excellent stability. If the carbon number of alkyl group (R) decreases, there is the tendency that compatibility is improved. Therefore, among alkyl group, the carbon number is preferably 1–4, and methyl group is most preferable.

Further, A represents an alkylene group having 2–4 carbon atoms, i.e., ethylene group, propylene group and/or butylene group. Alkylene groups of (n X m) presenting in one molecule may be the same, or may contain two kinds or three kinds of the above-mentioned alkylene groups. Therefore, (AO)n (polyoxyalkylene group) of m can be obtained by polymerizing after appropriately selecting one kind or two kinds or more from ethylene oxide, propylene oxide and butylene oxide. In the polyoxyalkylene group, the proportion of each oxyalkylene group is not particularly limited. However, in the case of only one kind, oxypropylene group (PO) is preferable, and in the case of two kinds or more (copolymerization), it is preferable at least to contain oxyethylene group (EO) for ensuring compatibility. However, if the proportion of oxyethylene group increases, hygroscopicity increases, and it may be observed that pour point heightens and solidification occurs at room temperature. The proportion of the number of oxyethylene groups (EO) to the total number of oxyalkylene groups (AO) is preferably 50% or less, more preferably 10–30%. Further, in the case of copolymerization, the kind of polymerization may be any of block polymerization, random polymerization, or a combination thereof. However, in view of low temperature characteristics such as flowability, random polymerization or polymerization at least partially containing random polymerization is preferable.

In the above formula, the degree of polymerization of oxyalkylene group (AO), n, is an integer of 2 or more, and may appropriately be adjusted so as to obtain a polyether compound having appropriate viscosity and molecular weight. The integer n is preferably 2–150, more preferably 5–100. There is the tendency that the molecular weight of polyether is generally in direct proportion to the viscosity. The molecular weight and viscosity of the polyether compound represented by the formula (1) used in the present invention are not particularly limited. However if the viscosity decreases, sealing property deteriorates and lubricity also lowers. Whereas, if the viscosity increases, compatibility lowers and energy-saving property decreases. Therefore, kinematic viscosity at 40° C. of the polyether compound is preferably 15–200 mm$^2$/s, more preferably 20–150 mm$^2$/s. The molecular weight is preferably about 300–3000. The polyether compound having such a viscosity and molecular weight can be obtained by appropriately adjusting X, A, R, m and n in the formula (1).

Aromatic amine compound or phenothiazine compound as another component (B) contained in the lubricant for a refrigeration system of the present invention is used as one of additives, and prevents oxidation of the lubricant. Generally, as an antioxidant for a lubricant other than compounds of component (B), phenol type, sulfur type, zinc thiophosphate type antioxidant and the like are known. However, those antioxidants are not necessarily effective as additives for a lubricant for a refrigeration system using ammonia refrigerant. Phenol type antioxidants have the problem forming separation substances by reacting with ammonia and then plugging capillary or the like. Further, sulfur type and zinc thiophosphate type antioxidants have the problem on corrosion, and there is the possibility that separation substances or rusts are formed to promote deterioration of a lubricant, thereby plugging capillary or expansion valve. To the contrary, the aromatic amine compound or phenothiazine used in the present invention is a chemically similar compound to ammonia of a refrigerant, and has high affinity and good compatibility with ammonia.

Specific examples of the aromatic amine compound or phenothiazine compound include dipyridylamine, phenothiazine, phenothiazine derivatives in which alkyl group is added to phenylene group, dialkyldiphenyl amine, diphenyl-p-phenylenediamine, diphenyl-p-phenylenediamine in which phenyl group is substituted with naphthyl group, alkyl group or the like, and dialkylphenyl-p-phenylenediamine, and the like. Of those, dipyridylamine, p,p'-dialkyldiphenylamine having alkyl group having 4–20 carbon atoms, preferably 4–12 carbon atoms, more preferably 8 carbon atoms, and N,N-dialkylphenyl-p-phenylenediaminehavingalkyl group having 2–20 carbon atoms, more preferably 4–12 carbon atoms, are preferable.

The addition amount of the aromatic amine compound or phenothiazine compound is preferably 0.01–5.0% by weight, more preferably 0.05–1.0% by weight, on the basis of the whole lubricant for a refrigeration system. If the addition amount is small, effect as an antioxidant is not obtained, on the other hand, if it is added exceeding 5.0% by weight, improvement in effect corresponding to the addition amount is not observed, this is not economical. Further, as it is observed that the oil tends to color by adding in large amount, excessive addition should be avoided.

The lubricant for a refrigeration system of the present invention, preferably further comprises (C) at least one kind of alcohol compound selected from the group consisting of oleyl alcohol, polyhydricalcohol partial ester and polyhydric alcohol partial ether, and/or (D) at least one kind of benzotriazole compounds selected from benzotriazole and its derivative, other than the above-mentioned aromatic amine compound or phenothiazine compound, as additive.

Further, it is preferable to use one kind or two kinds or more of any compounds of oleyl alcohol, polyhydric alcohol partial ester and polyhydric alcohol partial ether as component (C) in order to particularly improve abrasion resistance. Of those, polyhydric alcohol partial ester and polyhydric alcohol partial ether are preferable.

The polyhydric alcohol partial ester is a compound represented by the following formula (2);

$$R_4(OH)p[OC(O)R_5]q \qquad (2)$$

where $R_4$ represents straight-chain or branched-chain, and saturated or unsaturated hydrocarbon group having 2–12 carbon atoms, corresponding to a residue of (p+q)-valent polyhydric alcohol, $R_5$ represents straight-chain or branched-chain, and saturated or unsaturated hydrocarbon group having 3–20 carbon atoms, p is the number of hydroxyl groups remaining unesterified, q is the number of esterified acyl groups, and p and q are integers satisfying $1 \leq p < 6$, $1 \leq q < 6$ and $2 \leq p+q < 6$. More specifically, it is a partial ester of a polyhydric alcohol such as glycol, glycerin, trimethylol propane, pentaerythritol, sorbitan or sorbitol, and a straight-chain or branched-chain, saturated or unsaturated fatty acid having 4–21 carbon atoms. Of those, a partial ester of glycerin, sorbitan or sorbitol, and fatty acid having 10–20 carbon atoms is preferable, fatty acid monoester is more preferable, and fatty acid monoester of glycerin is particularly preferable.

The polyhydric alcohol partial ether is a compound represented by the following formula (3);

$$R_6(OH)r(OR_7)s \qquad (3)$$

where $R_6$ represents straight-chain or branched-chain, and saturated or unsaturated hydrocarbon group having 2–12 carbon atoms, corresponding to a residue of (r+s)-valent polyhydric alcohol, $R_7$ represents straight-chain or branched-chain, and saturated or unsaturated hydrocarbon group having 3–20 carbon atoms, r is the number of hydroxyl groups remaining unetherified, s is the number of etherified ether bonds, and r and s are integers satisfying $1 \leq r < 6, 1 \leq s < 6$ and $2 \leq r+s < 6$. More specifically, it is a partial ether obtained by condensation of a polyhydric alcohol such as glycol, glycerin, trimethylol propane, pentaerythritol, sorbitan or sorbitol, and a straight-chain or branched-chain, and saturated or unsaturated monool having 3–20 carbon atoms. Of those, a partial ether of glycerin, sorbitan or sorbitol, and monool having 10–20 carbon atoms is preferable, monoether is more preferable, and monoether of glycerin is particularly preferable.

In the lubricant for a refrigeration system of the present invention, the addition amount of alcohol compound of component (C) is not particularly limited, and may appropriately be selected in accordance with the situation. The amount is preferably 0.1–2.0% by weight, particularly preferably 0.2–1.0% by weight, on basis of the whole lubricant.

The benzotriazole derivative is a compound represented by the following formula (4);

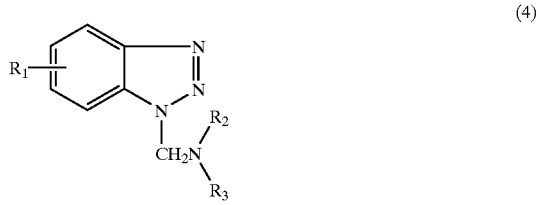

where $R_1$, $R_2$ and $R_3$ represent hydrogen, an alkyl group having 1–20 carbon atoms or an aryl group having 1–20 carbon atoms, and may be the same or different. Benzotriazole is a compound that substituents bonding to nitrogen atom at the lowest portion in the formula (4) are hydrogen atom. It is assumed that metal surface is covered with those compounds so that the compounds have the function to protect metal material from corrosive substance such as ammonia refrigerant.

In the lubricant for a refrigeration system of the present invention, addition amount of the benzotriazole compound of component (D) is not particularly limited and may appropriately. be selected according to the situation. The amount is preferably 1–200 ppm by weight, particularly preferably 5–50 ppm by weight, to the whole lubricant.

Refrigerant used together with the lubricant for a refrigeration system of the present invention is ammonia refrigerant. This should be understood to be a refrigerant comprising ammonia. That is, such a refrigerant corresponds to not only a refrigerant consisting of ammonia, but two components-mixed refrigerant containing ammonia and low molecular weight hydrocarbon compound or ammonia and the above-mentioned fluorinated hydrocarbon, and three components-mixed refrigerant containing ammonia, low molecular weight hydrocarbon compound and the above-mentioned fluorinated hydrocarbon.

The lubricant for a refrigeration system of the present invention and ammonia refrigerant may be filled in appropriate proportion in accordance with the specification or manual of refrigeration system applied. Specifically, ammonia refrigerant/lubricant ratio for a refrigeration system by weight is in a range of preferably 99/1–1/99, more preferably 95/5–30/70.

If necessary, the lubricant for a refrigeration system of the present invention may optionally contain conventional lubricant base oils for a refrigeration system, such as naphthenic mineral oils or synthetic oils (e.g., alkylbenzene oils, ether oils, ester oils or fluorinated oils) and conventional additives. Examples of the additives include stabilizers such as phenylglycidyl ether or alkylglycidyl ether, extreme pressure agents such as tricresyl phosphate or triphenyl phosphate, and defoamers such as polydimethylsiloxane or polymethacryl acrylate. Further, conventional additives such as dispersants, viscosity index improvers, anti-rusts, corrosion inhibitors, pour point depressants can optionally be compounded. Those additives are generally mixed with the lubricant of the present invention in an amount of 10 ppm to 10% by weight.

EXAMPLE

The present invention is described in more detail below by the Examples, but the invention is not limited to those specific examples.

Examples 1–11 and Comparative Examples 1–6

Antioxidants (two kinds), corrosion inhibitor (one kind) and anti-abrasives (three kinds) as additives were added to two kinds of polyether compound as a base oil in amounts shown in Table 1, and those were mixed to prepare sample oils for use in evaluation tests of Examples and Comparative Examples. Evaluation tests of stability by sealed tube test and lubricating property by Falex seizure load were conducted on those sample oils. The results are shown in Table 1.

Further, the sample oils were prepared from the base oils and the additives listed below, and the evaluation tests were conducted by the test methods described later.

Base Oil (Two Kinds)
  PAG1: $CH_3O\,(PO)_m(EO)_nH$
    $m/n=8/2$, kinematic viscosity (40° C.)=46 mm²/s
  PAG2: $CH_3O(PO)_m(EO)_nH$
    $m/n=8/2$, kinematic viscosity (40° C.)=100 mm²/s catalyst after deterioration were the same as initial, respectively, it was evaluated as "no change". In the case that separation substance in the oil were observed and discoloration was observed on the catalyst, it was evaluated with 5 grades such that the strongest degree in the respective change was 5.

Lubricating Property Test (Falex Seizure Load)

According to ASTM D3233, a block made of a steel (AISI C-1137) and a pin made of a steel (SAE 3135) were used, an increasing load was applied thereto at an initial temperature of 40° C. and the rotation speed of 290 rpm, and the load when seizing was measured.

TABLE 1

| | Base oil, additive and amount thereof | | | | | | | Performance evaluation | | | |
|---|---|---|---|---|---|---|---|---|---|---|---|
| | Base oil | | Antioxidant | | Corrosion inhibitor | Anti-abrasive | | | Sealed tube test | | | Falex |
| | Symbol | Viscosity (40° C.) mm²/s | DOPA % | DBPC % | BTA ppm | GMOE % | GMO % | TCP % | Color of deteriorated oil (ASTM) | Appearance of deteriorated oil | Appearance of catalyst (Fe) | seizure load Lbf |
| Example 1 | PAG1 | 46 | 0.05 | | | | | | L0.5 | No change | Discoloration 3 | 860 |
| Example 2 | PAG1 | 46 | 0.1 | | | | | | L1.0 | No change | Discoloration 2 | 850 |
| Example 3 | PAG2 | 100 | 0.05 | | | | | | L0.5 | No change | Discoloration 3 | 930 |
| Example 4 | PAG1 | 46 | 0.05 | | 10 | | | | L0.5 | No change | Discoloration 1 | 870 |
| Example 5 | PAG1 | 46 | 0.05 | | 20 | | | | L0.5 | No change | No change | 880 |
| Example 6 | PAG1 | 46 | 0.05 | | | 0.5 | | | L0.5 | No change | Discoloration 1 | 920 |
| Example 7 | PAG1 | 46 | 0.05 | | | 1.0 | | | L1.0 | No change | No change | 940 |
| Example 8 | PAG1 | 46 | 0.05 | | | | 0.5 | | L0.5 | No change | Discoloration 1 | 910 |
| Example 9 | PAG2 | 100 | 0.05 | | | 0.5 | | | L0.5 | No change | No change | 1020 |
| Example 10 | PAG1 | 46 | 0.05 | | 10 | 0.5 | | | L1.0 | No change | No change | 940 |
| Example 11 | PAG2 | 100 | 0.05 | | 10 | 0.5 | | | L1.0 | No change | No change | 1030 |
| Comparative Example 1 | PAG1 | 46 | | | | | | | L3.0 | Separation 5 | Discoloration 5 | 860 |
| Comparative Example 2 | PAG2 | 100 | | | | | | | L2.5 | Separation 5 | Discoloration 4 | 940 |
| Comparative Example 3 | PAG1 | 46 | | 0.1 | | | | | L2.0 | Separation 2 | Discoloration 4 | 860 |
| Comparative Example 4 | PAG1 | 46 | | | | | | 0.5 | L1.0 | Separation 5 | Discoloration 5 | 960 |
| Comparative Example 5 | PAG1 | 46 | | | 10 | 0.5 | | | L2.0 | Separation 4 | Discoloration 3 | 940 |
| Comparative Example 6 | PAG1 | 46 | 0.05 | | | | | 0.5 | L1.5 | Separation 4 | Discoloration 5 | 960 |

In the above formulae, (PO) represents oxypropylene group, and (EO) represents oxyethylene group.

Additives
  Antioxidant (two kinds)
    DOPA: p,p'-dioctyl-di-phenylamine
    DBPC: 2,6-di-tertiary-butyl-p-cresol
  Corrosion inhibitor (one kind)
    BTA: Benzotriazole
  Anti-abrasive (three kinds)
    GMOE.: Glycerin monooleyl ether
    GMO: Glycerin monooleate
    TCP: Tricresyl phosphate Stability Test (Sealed Tube Test)

According to JIS K2211, a sealed tube in which 8 ml of a sample foil and 2 ml of R717 (ammonia refrigerant) were encapsulated together with iron catalyst in a bomb was aged at 150° C. for 14 days, after the ageing the appearance of the sample oil and the catalyst was observed and evaluated. In the case that the appearance of the sample oil and the According to Table 1, discoloration is observed on the appearance of the catalyst with respect to the sample oils (Examples 1–3) to which aromatic amine compound or phenothiazine compound was added, but is an acceptable degree. Further, it is understood that in the sample oils (Examples 4 and 5) to which benzotriazole in addition to aromatic amine compounds or phenothiazine compound was added, and the sample oils (Examples 6–9) to which glycerin monooleyl ether or glycerin monooleate was added, performances of stability and lubricating property are improved as compared with the oils of Examples 1–3. It is also understood that performances are further improved in the sample oils (Examples 10 and 11) to which aromatic amine compound or phenothiazine compound, benzotriazole and glycerin monooleyl ether were added.

It is understood that the sample oils of the Comparative Examples shown in the lower columns of Table 1 are far poor in the appearance of sample oils and the appearance of catalysts as compared with those of the Examples.

The lubricants for a refrigeration system using ammonia refrigerant according to the present invention uses a polyether compound as a base oil, contains an aromatic amine compound or a phenothiazine compound, and preferably further contains an alcohol compound such as a polyhydric alcohol partial ether and/or a benzotriazole compound, so that it shows remarkable effect that not only compatibility with ammonia but performances such as stability and lubricating property are greatly improved. Therefore, the lubricant of the present invention can suitably be used in a compression type refrigeration system using ammonia refrigerant that does not have the possibility of ozone layer depletion or global warming phenomenon.

What is claimed is:

1. A lubricant for a compression type refrigeration system using ammonia as a refrigerant, comprising:

(A) at least one polyether compound, (B) at least one member selected from the group consisting of dipyridylamine; phenothiazine; phenothiazine derivatives in which an alkyl group is added to the phenylene group; dialkyldiphenyl amine; diphenyl-p-phenylenediamine; diphenyl-p-phenylenediamine in which the phenyl group is substituted with a naphthyl group or an alkyl group; and dialkyl-p-phenylenediamine, and (C) at least one alcohol compound selected from the group consisting of oleyl alcohol, polyhydric alcohol partial esters, and polyhydric alcohol partial ethers.

2. The lubricant according to claim 1, further comprising (D) at least one benzotriazole compound selected from benzotriazole and its derivatives.

3. The lubricant according to claim 1, wherein the at least one member is contained in an amount of 0.01–5.0% by weight of the lubricant.

4. The lubricant according to claim 2, wherein the benzotriazole compound is contained in an amount of 1–200 ppm by weight of the lubricant.

5. A working fluid composition for a compression type refrigeration system, comprising a lubricant as claimed in claim 1 and an ammonia refrigerant.

6. A refrigeration system comprising a compressor, a condenser, an expansion mechanism and an evaporator, wherein the working fluid composition as claimed in claim 5 is filled.

7. The lubricant according to claim 2 wherein the alcohol compound is contained in an amount of 0.1–2.0% by weight, and the benzotriazole compound is contained in an amount of 1–200 ppm by weight of the lubricant.

8. A working fluid composition for a compression type refrigeration system, comprising a lubricant as claimed in claim 3, and an ammonia refrigerant.

9. A working fluid composition for a compression type refrigeration system, comprising a lubricant as claimed in claim 4, and an ammonia refrigerant.

10. A working fluid composition for a compression type refrigeration system, comprising a lubricant as claimed in claim 5, and an ammonia refrigerant.

11. A working fluid composition for a compression type refrigeration system, comprising a lubricant as claimed in claim 9, and an ammonia refrigerant.

12. A refrigeration system comprising a compressor, a condenser, an expansion mechanism and an evaporator, wherein the working fluid composition as claimed in claim 8 is filled.

13. A refrigeration system comprising a compressor, a condenser, an expansion mechanism and an evaporator, wherein the working fluid composition as claimed in claim 9 is filled.

14. A refrigeration system comprising a compressor, a condenser, an expansion mechanism and an evaporator, wherein the working fluid composition as claimed in claim 10 is filled.

15. A refrigeration system comprising a compressor, a condenser, an expansion mechanism and an evaporator, wherein the working fluid composition as claimed in claim 11 is filled.

16. A lubricant according to claim 1, wherein the at least one alcohol compound is selected from the group consisting of oleyl alcohol and polyhydric alcohol partial ethers.

17. A lubricant for a refrigeration system using ammonia as a refrigerant, comprising:

(A) at least one polyether compound, (B) at least one member selected from the group consisting of aromatic amine compounds and phenothiazine compounds, and (C) at least one alcohol compound selected from the group consisting of oleyl alcohol, polyhydric alcohol partial esters, and polyhydric alcohol partial ethers.

18. A lubricant according to claim 17, comprising two alcohol compounds selected from the group consisting of oleyl alcohol, polyhydric alcohol partial esters, and polyhydric alcohol partial ethers.

19. A lubricant according to claim 17, wherein the at least one alcohol compound is selected from the group consisting of oleyl alcohol and polyhydric alcohol partial ethers.

* * * * *